J. KONAR.
PERCOLATOR.
APPLICATION FILED AUG. 7, 1913.
1,127,780.
Patented Feb. 9, 1915.
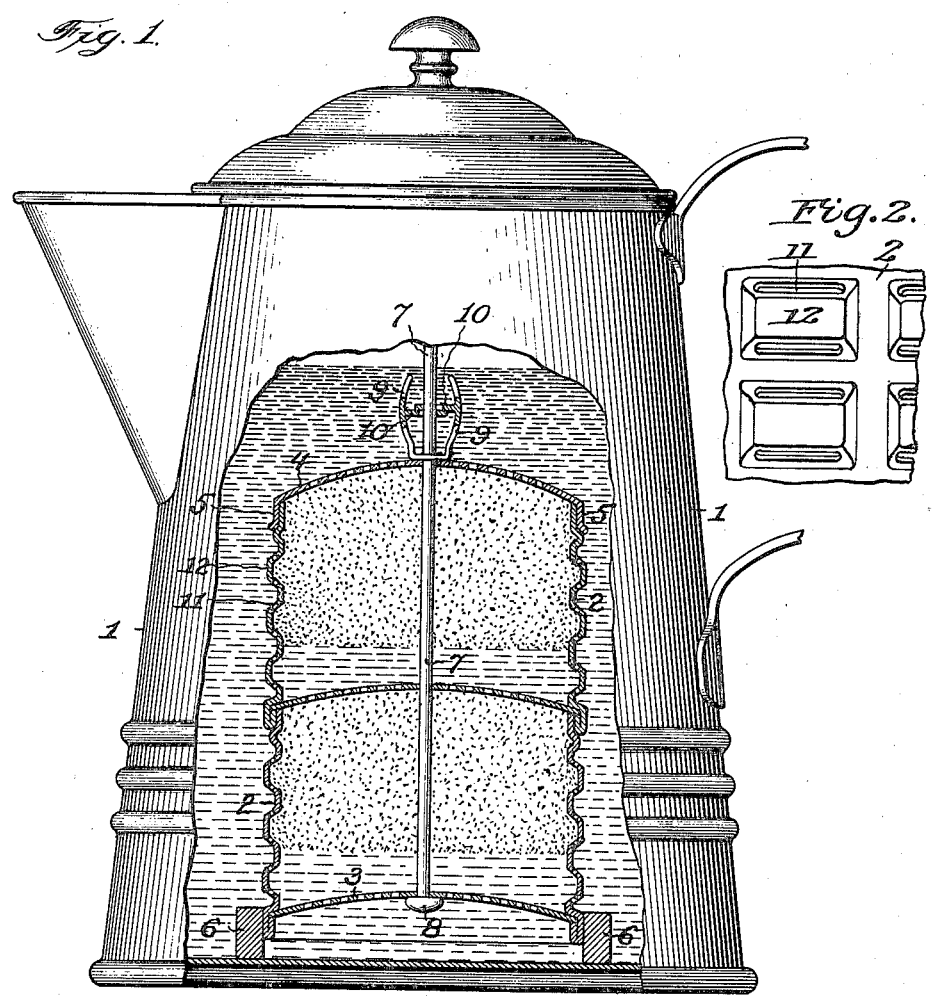
Attest:
Chas. H. Buell
Henry Moe
Inventor:
John Konar;
By Robert Burns, Atty.

UNITED STATES PATENT OFFICE.

JOHN KONAR, OF CHICAGO, ILLINOIS.

PERCOLATOR.

1,127,780.

Specification of Letters Patent.

Patented Feb. 9, 1915.

Application filed August 7, 1913. Serial No. 783,578.

*To all whom it may concern:*

Be it known that I, JOHN KONAR, a citizen of the United States of America, and a resident of Chicago, in the county of Cook, State of Illinois, have invented certain new and useful Improvements in Percolators, of which the following is a specification.

This invention relates to that type of percolators which constitute the subject matter of my prior application for Letters Patent, Serial No. 675,257, filed February 3, 1912. And the present improvement has for its object to provide a simple and efficient structural formation of the foraminous vertical wall of the percolator casing, adapted to afford a very efficient retention of the ground coffee within the chamber of the percolator without undue impedance to the flow of the heated fluid used in the preparation of the beverage, and which in addition is adapted to impart increased rigidity to the wall of the percolator casing, all as will hereinafter more fully appear.

In the accompanying drawings: Figure 1, is a sectional elevation illustrating the preferred form of the present invention in place in the interior of a coffee pot. Fig. 2, is an enlarged elevation of a portion of the vertical wall of the percolator casing.

Similar reference numerals indicate like parts in the several views.

Referring to the drawings, 1 represents a coffee pot or other vessel in which the beverage is prepared.

2 is the main body portion of the container preferably of a cylindrical shape and formed of the hereinafter described foraminous sheet metal structure.

3 is the usual foraminous bottom closing the lower end of the main body 2.

4 is a cap formed of foraminous metal or material and having a marginal downturned rim 5, for detachable engagement with the marginal open top of the main body 2 and constituting a closure therefor.

In the construction shown the outer diameter of the upper end of the main body 2 is the same as the inner diameter of the lower end of said main body, and to this end the aforesaid bottom 3 is disposed a distance above the lower margin of the main body 2, as shown.

The described construction is adapted to permit a fitting or assemblage of the upper end of one container into the lower end of a companion container, so that a plurality of containers each having an independent compartment, can be superimposed one above the other in any required succession to either increase the beverage making capacity when required, or to permit the use or disposal of different grades of coffee in the independent compartments, as for instance the reuse of the previous coffee grounds and a fresh quantity of coffee in the respective containers.

6 is a heavy annular rim surrounding the lower periphery of the main body 2 of the container and carried thereby. As in my former construction, Serial No. 675,257, the excess weight of this rim 6 is adapted to maintain the container, with its buoyant contents, in a submerged condition in the fluid and resting upon the bottom of the pot or vessel 1, and is also adapted to resist a tendency to undue lifting or tilting of the container by the circulation of the heated fluid in the usual cooking operation to which it is exposed in actual use.

7 is a centrally disposed connecting member connected at its lower end to the bottom 3 of the lowermost container, and extending vertically through a plurality of bottoms 3 when a plurality of containers are used, and through the cap 4, at which point independent movement between the parts is prevented by a suitable fastener having detachable engagement with the said connecting member 7. In the preferred construction shown in the drawings the centrally disposed connecting member 7 is formed of a rod of metal or the like, having a headed lower end 8 adapted to engage the bottom 3 of the lowermost container as shown. The upper end of said rod 7 extends a distance above the topmost container to afford a means for handling the appliance, as well as to receive the fastening means now to be described.

9 is a spring clip of an approximately U shape, the lower end of which is orificed for the passage of the rod or member 7.

10 are a pair of opposed jaws attached midway the height of the spring clip 9 and formed with elongated orifices which encircle the rod or member 7. In the normal condition of the spring clip 9, the resiliency of the same, is adapted to hold the jaws 10 in binding engagement with the rod or member 7, and prevent any accidental movement of said clip along said rod or member. When an adjustment is desired the members of the spring clip 9 are pressed toward each other by the fingers of the operator to relieve the binding or holding engagement above described, to permit the spring clip being shifted along the rod to the proper point of engagement.

11 are narrow slits or sheared openings in the walls of the container. These openings are obtained without loss of material, as is the case with ordinary perforations, and consequently an increased number of such openings can be put in a given area without weakening the container. Increased percolation of water through the contents being the result.

12 are a series of bosses or protuberances formed in the walls of the container, preferably during the operation of shearing the slits 11, aforesaid. The jagged and sharp edges of the slits are thereby turned toward each other and guarded by the raised backs of the bosses or protuberances 12, from injury to the fingers of the operator. The bosses or protuberances also tend to increase the rigidity of the container.

Having thus fully described my said invention what I claim as new and desire to secure by Letters Patent, is:—

1. A container for percolators, a wall of which is formed with slitted openings and with bosses or protuberances extending beyond the edges of said openings.

2. A receptacle comprising a body portion of sheet material which is foraminated by slitted openings the displaced material remaining expanded as protuberances beyond the edges of said openings.

Signed at Chicago, Illinois, this 2nd day of August, 1913.

JOHN KONAR.

Witnesses:
  ROBERT BURNS.
  HENRY MOE.